March 4, 1958 D. A. MICKELS 2,825,575
VEHICLE OF THE SCOOTER TYPE
Filed June 21, 1956 2 Sheets-Sheet 2
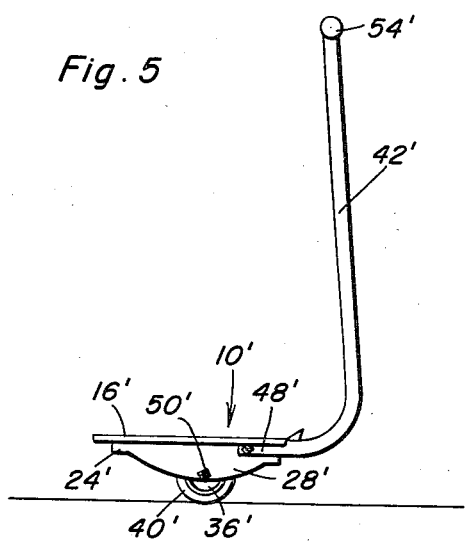
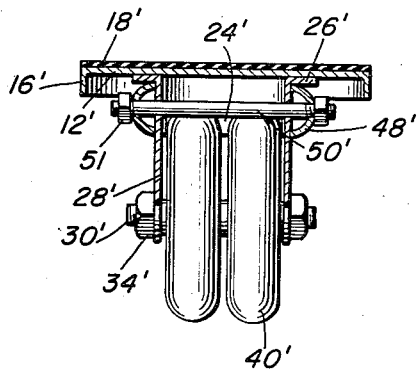
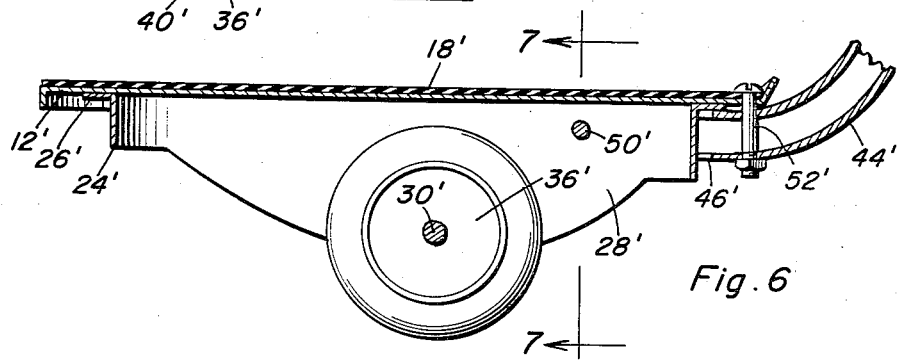
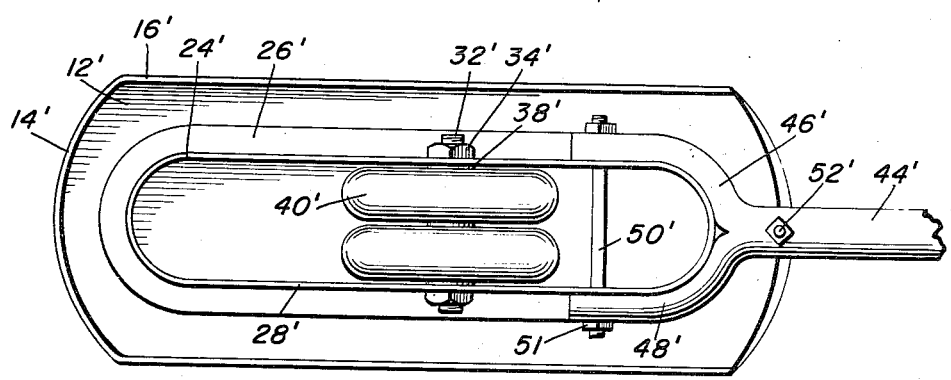
Dean A. Mickels
INVENTOR.

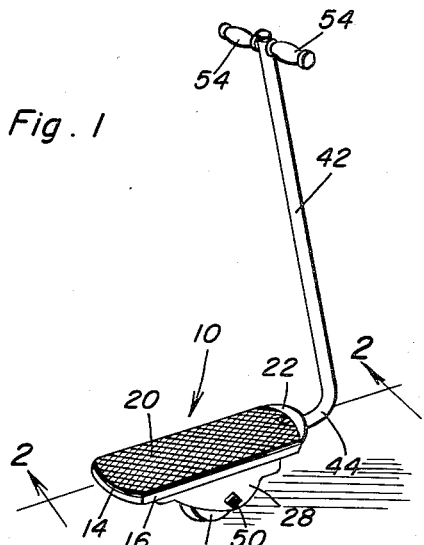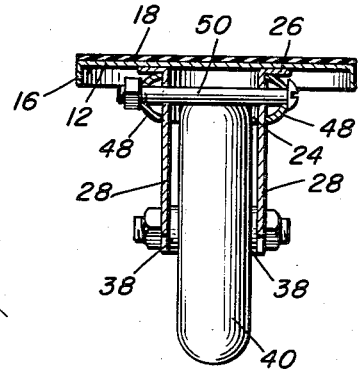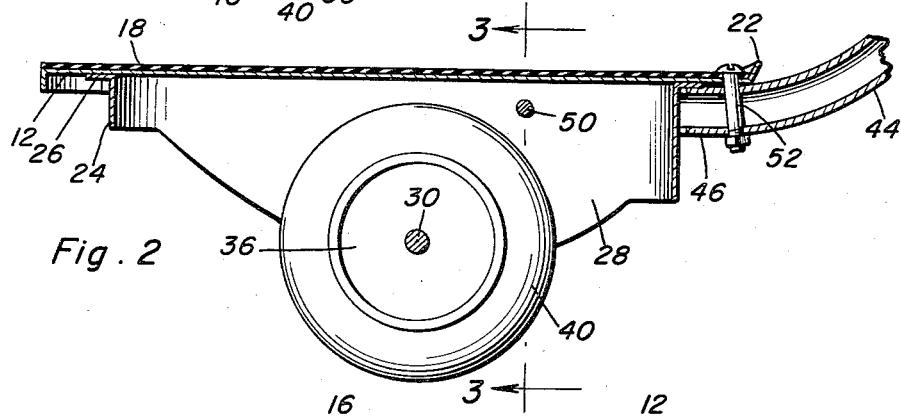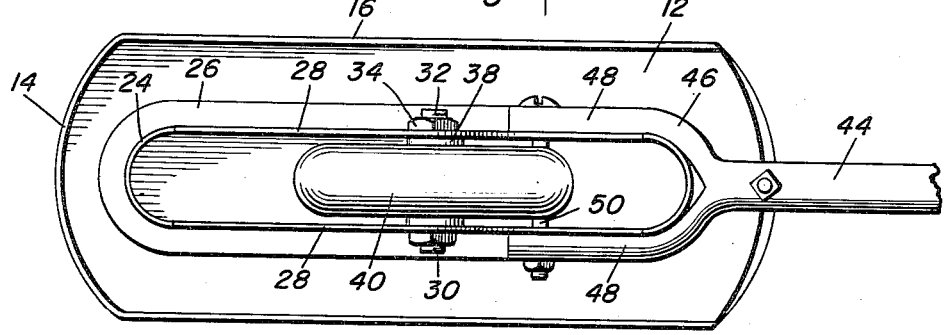
Dean A. Mickels
INVENTOR.

United States Patent Office 2,825,575
Patented Mar. 4, 1958

2,825,575

VEHICLE OF THE SCOOTER TYPE

Dean A. Mickels, Portland, Oreg.

Application June 21, 1956, Serial No. 592,836

4 Claims. (Cl. 280—87.04)

This invention generally relates to a vehicle and more particularly to that type of vehicle generally known as a scooter having a single axle supporting rotatable ground engaging means and a platform with an upstanding handle wherein the vehicle is primarily for use by children wherein one foot is placed on the platform and by grasping the handle and imparting forward thrust by engaging the other foot with the ground surface, the vehicle may be caused to move on the ground surface in a desired manner.

The primary object of the present invention is to provide a vehicle especially adapted for use by children incorporating all of the features of a scooter with the exception of providing only a single transverse axle disposed transversely of the vehicle substantially at the center thereof whereby the vehicle will develop an acute sense of balance and also provide a vehicle requiring some skill to operate efficiently but still within the realm of skill of children.

Other objects of the present invention will reside in its simplicity of construction, attractive appearance, adaptation for its particular purposes and its relatively inexpensive manufacturing cost.

These together with other objects and advantages which will become substantially apparent reside in the details of construction and operation as more fully hereinafter described and claimed, reference being had to the accompanying drawings forming a part hereof, wherein like numerals refer to like parts throughout, and in which:

Figure 1 is a perspective view of the single wheel form of the present invention;

Figure 2 is a longitudinal, vertical sectional view taken substantially upon a plane passing along section line 2—2 of Figure 1 illustrating the details of construction of the single wheel type vehicle;

Figure 3 is a transverse sectional view taken substantially upon a plane passing along section line 3—3 of Figure 2 illustrating the manner of attaching the handle to the depending flange and the relationship of the wheel and the depending flange;

Figure 4 is a bottom plan view of the construction of Figure 1 illustrating details of construction thereof;

Figure 5 is a side elevational view of the dual wheeled form of the vehicle of the present invention;

Figure 6 is a longitudinal, vertical sectional view taken substantially upon a plane passing along the longitudinal center of the construction of Figure 5;

Figure 7 is a transverse, vertical sectional view taken substanitally upon a plane passing along section line 7—7 of Figure 6 illustrating the details of construction of the dual wheeled form of the invention; and Figure 8 is a bottom plane view of the construction of Figure 5 illustrating further structural details thereof.

Referring now specifically to Figures 1–4 of the official drawings, the numeral 10 generally designates the single wheeled type of vehicle or scooter of the present invention which includes a generally elongated platform 12 which is substantially rectangular in configuration and provided with a rounded rear edge having a depending rear flange 14 and also depending side flanges 16 which are relatively shallow in depth. The upper surface of the platform 12 is provided with a coating or covering 18 of friction increasing material which may be scored as designated by the numeral 20 into a checkerboard design for increasing the frictional resistance to sliding movement of a foot positioned on the upper surface thereof. The forward end of the platform 12 is provided with an upwardly extending lip 22 for limiting forward sliding movement of a foot positioned on the surface of the covering 18 and the platform 12.

Mounted on the undersurface of the platform 12 is a depending oval shaped continuous flange 24 having an outwardly extending peripheral flange 26 at its upper edge for attachment to the undersurface of the platform 12. The central portion of the side portions of the flange 24 which are substantially parallel and designated by the numeral 28 extend downwardly below the end portions of the flanges 24 and receive an axle or axle bolt 30 therebetween. The ends of the axle bolt 30 are threaded as designated by the numeral 32 for receiving screw threaded nuts 34 thereby mounting the axle or axle bolt 30 on the side portions 28 of the flange 24. Rotatably mounted on the axle 30 is a wheel 36 having a central hub portion 38 which extends to each side of the wheel 36 for engagement with the inner surface of the parallel side portions 28 of the flange 24 thereby positioning the wheel 36 centrally between the side portions 28 of the flange 24 and centrally of the platform 12. The wheel 36 may be provided with a pneumatically inflatable tire 40 having a rounded peripheral surface to permit tilting of the platform 12 about a longitudinal as well as transverse axis.

A generally upstanding and slightly rearwardly inclined elongated tubular handle 42 is provided with a rearwardly extending lower end portion 44 which terminates in a U-shaped attaching portion 46 having spaced parallel legs 48 which lie alongside the forward upper edges of the flange 24 with the bight portion of the U-shaped attaching portion 46 generally engaging the rounded forward end of the flange 24 with the bight portion of the U-shaped member 46 being disposed rearwardly of the forward edge of the platform 12. A transverse bolt 50 extends through the free end of the legs 48 and also through the side portions 28 of the flange 24 for rigidly securing the U-shaped attaching portion 46 to the flange 24. The portion of the rearwardly extending lower end 44 underlying the platform 12 is secured to the platform 12 by a fastening bolt 52 which extends downwardly from the upper surface of the platform 12 and through the rearwardly extending portion 44 for rigidly securing the handle 42 to the platform 12, whereupon pivotal movement of the platform 12 may be controlled by the handle 42. For facilitating control of the platform 12, a pair of laterally extending hand grip members 54 are provided on the upper end of the tubular handle 42 wherein the hand grips 54 may be the conventional type of rubber hand grips provided on tricycles or bicycles.

In operation, one foot is placed on the upper surface of the platform 12 or the coating or covering 18 and the hand grips 54 are grasped. By providing forward force with the other foot, the vehicle 10 may be propelled over the ground surface on the rotatable wheel 36. By balancing the device and controlling the direction of movement thereof, the vehicle 10 may be used in the manner of a scooter with only a single axle and a single supporting wheel.

Referring now specifically to that form of the invention illustrated in Figures 5–8, the construction of all of the elements are the same except for the construction of the continuous depending flange designated by the numeral 24' having the parallel side portions 28' and peripheral outwardly extending flange 26' at the upper edge thereof. The side flanges 28' of the flange 24' are spaced apart a greater distance than the side portions of the flanges 24 for receiving an elongated support axle 30' which is threaded at the external ends thereof as designated by the numeral 32' for receiving nuts 34'. A pair of wheels 36' are supported on the bolt 32 with each of the wheels 36' having a central hub 38' and a pneumatic tire 40' with the wheels 36' being disposed in side by side relation substantially at the center of the platform 12'.

The rearwardly extending portion 44' of the handle 42' is provided with a U-shaped attaching portion 46' having leg portions 48' spaced apart a greater distance than the legs 48 of the device illustrated in Figures 1–4 for positioning on opposite sides of the side portions 28' of the flange 24' for securing thereto by a bolt 50' having nuts 51 screw threaded on each end thereof. A fastening bolt 52' extends downwardly through the platform 12' and the rearwardly extending portion 44' for rigidly securing the handle 42' to the platform 12'.

The device illustrated in Figures 5–8 operates in substantially the same manner as the device illustrated in Figures 1–4 with the exception that the dual wheels 36' provide slightly more lateral stability to the vehicle. In each instance the vehicle provides a novel type of occupant propelled vehicle which is substantially in the nature of a scooter with one model having a single wheel and the other model having a dual wheel with both models or forms having only a single transverse axis of rotation for the wheels.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A scooter comprising an elongate foot supporting platform, an upstanding handle secured to one end of said platform, a single transverse axle mounted beneath said platform substantially midway of the length of said platform, and narrow wheel means on said axle positioned substantially medially of the sides of said platform whereby said scooter must be balanced both laterally and longitudinally by the user thereof.

2. A scooter comprising an elongate foot supporting platform, an upstanding handle at one end of said platform, a single transverse axle mounted beneath said platform substantially midway of the length thereof, and a single wheel mounted on said axle medially between the opposite sides of said platform whereby said scooter is devoid of inherent lateral and longitudinal stability and must be balanced by the user thereof.

3. A scooter comprising an elongate foot supporting platform, an upstanding handle at one end of the platform, a pair of wheels positioned beneath said platform in coaxial side-by-side relation, the axis of said wheels being located substantially midway of the length of said platform, and means supporting said platform on said wheels, the rims of said wheels being spaced apart a distance substantially less than the width of said platform whereby said scooter is not substantially stable laterally or longitudinally and must be balanced by the user.

4. A scooter of the single axle type comprising a platform forming an area for positioning a foot of the operator, a depending continuous flange disposed inwardly of the peripheral edge of said platform, the forward end of said flange being rounded, an upstanding handle at one end of said platform having a rearwardly extending portion terminating in a U-shaped portion straddling and securing said rounded flange end, the upper end of said handle being provided with laterally extending hand grips, a transversely extending axle disposed between parallel side portions of said flange substantially under the center of said platform, and ground-engaging wheel means rotatively supported by said axle and forming the sole support for said platform.

References Cited in the file of this patent

UNITED STATES PATENTS

| | | |
|---|---|---|
| 1,269,107 | Moomow | June 11, 1918 |
| 1,585,258 | Moore | May 18, 1926 |
| 1,697,994 | Moore | Jan. 8, 1929 |
| 1,706,048 | Van De Mark | Mar. 19, 1929 |
| 2,582,143 | Maas | Jan. 8, 1952 |

FOREIGN PATENTS

| | | |
|---|---|---|
| 186,206 | Great Britain | Sept. 28, 1922 |